US009051399B2

(12) United States Patent
Okumura et al.

(10) Patent No.: US 9,051,399 B2
(45) Date of Patent: Jun. 9, 2015

(54) METHOD FOR PRODUCING POLAR GROUP-CONTAINING OLEFIN COPOLYMERS

(75) Inventors: Yoshikuni Okumura, Oita (JP); Daisuke Yagyu, Oita (JP)

(73) Assignees: SHOWA DENKO K.K., Tokyo (JP); THE UNIVERSITY OF TOKYO, Tokyo (JP)

( * ) Notice: Subject to any disclaimer, the term of this patent is extended or adjusted under 35 U.S.C. 154(b) by 16 days.

(21) Appl. No.: 13/820,799

(22) PCT Filed: Jul. 1, 2011

(86) PCT No.: PCT/JP2011/065170
§ 371 (c)(1),
(2), (4) Date: Mar. 5, 2013

(87) PCT Pub. No.: WO2012/032836
PCT Pub. Date: Mar. 15, 2012

(65) Prior Publication Data
US 2013/0165607 A1      Jun. 27, 2013

(30) Foreign Application Priority Data

Sep. 6, 2010   (JP) ................................ 2010-198722
May 27, 2011   (JP) ................................ 2011-119120

(51) Int. Cl.
| | | |
|---|---|---|
| *C08F 4/70* | (2006.01) | |
| *C08F 4/80* | (2006.01) | |
| *C08F 2/00* | (2006.01) | |
| *C08F 210/02* | (2006.01) | |
| *C08F 4/60* | (2006.01) | |

(52) U.S. Cl.
CPC .............. *C08F 4/70* (2013.01); *C08F 4/60065* (2013.01); *C08F 4/7031* (2013.01); *C08F 210/02* (2013.01)

(58) Field of Classification Search
CPC ..................................... C08F 4/70; C08F 2/00
USPC ....................... 526/67, 69, 172, 161, 319, 348
IPC ..................... C08F 4/60065, 4/70, 4/7031, 2/00
See application file for complete search history.

(56) References Cited

U.S. PATENT DOCUMENTS 3,436,380 A * 4/1969 Davison ........................ 526/67
5,750,816 A * 5/1998 Araki et al. ................... 585/512

(Continued)

FOREIGN PATENT DOCUMENTS

JP       2000-63405 A      2/2000
JP       2001-2608 A       1/2001

(Continued)

OTHER PUBLICATIONS

Ito et al. J. Am. Chem. Soc. 2009, 131, 14606-14607.*

(Continued)

*Primary Examiner* — Rip A Lee
(74) *Attorney, Agent, or Firm* — Sughrue Mion, PLLC

(57) ABSTRACT

The present invention relates to a method of producing a polymer in the method for producing a copolymer of olefin and a polar group-containing monomer represented by formula (1):

$$C(R^1)_2\!\!=\!\!C(R^1)(C(R^1)_2)_nR^2 \qquad (1)$$

(in the formula, the symbols have the same meanings as described in the description), the method comprising using a complex of a metal in Group 10 of the periodic table as a catalyst; and supplying a catalyst solution separated from a polymer after the polymerization reaction to a polymerization reaction system to recycle and re-use the catalyst. The production method of the present invention can dramatically reduce the catalyst cost.

10 Claims, 1 Drawing Sheet

(56) References Cited

U.S. PATENT DOCUMENTS

| | | | |
|---|---|---|---|
| 5,910,619 A * | 6/1999 | Urata et al. | 585/513 |
| 6,340,728 B1 * | 1/2002 | Oh et al. | 526/70 |
| 2003/0216251 A1 | 11/2003 | Speiser et al. | |
| 2008/0207856 A1 * | 8/2008 | Goodall et al. | 526/171 |
| 2012/0116036 A1 * | 5/2012 | Nozaki et al. | 526/171 |
| 2013/0158223 A1 * | 6/2013 | Ito et al. | 526/318.6 |

FOREIGN PATENT DOCUMENTS

| | | | |
|---|---|---|---|
| JP | 2003-292524 A | 10/2003 | |
| JP | 2007-46032 A | 2/2007 | |
| JP | 2007-046032 A * | 2/2007 | C08F 4/80 |
| JP | 2008-214629 A | 9/2008 | |

OTHER PUBLICATIONS

Nozaki et al. JP 2007-046032 (Feb. 22, 2007); abstract and translation in English.*

Lynda K. Johnson et al., "Copolymerization of Ethylene and Propylene with Functionalized Vinyl Monomers by Palladium(II) Catalysts", J. Am. Chem. Soc. 1996, pp. 267-268, vol. 118.

Shingo Ito et al., "Copolymerization of Vinyl Acetate with Ethylene by Palladium/Alkylphosphine-Sulfonate Catalysts", J. Am. Chem. Soc. 2009, pp. 14606-14607, vol. 131.

* cited by examiner

METHOD FOR PRODUCING POLAR GROUP-CONTAINING OLEFIN COPOLYMERS

CROSS REFERENCE TO RELATED APPLICATIONS

This application is a National Stage of International Application No. PCT/JP2011/065170 filed Jul. 1, 2011, the contents of which are incorporated herein by reference in their entirety.

TECHNICAL FIELD

The present invention relates to a method for producing a polar group-containing olefin-based copolymer, and more specifically, to a method for producing a copolymer of olefin and a polar group-containing monomer, the method including recycling and re-using a catalyst made of a complex of a metal in Group 10 of the periodic table.

BACKGROUND ART

Polymer industry has been playing a pivotal role in the petrochemical industry, and production processes for polymers have undergone various kinds of technological innovation in correspondence with trends in the polymer industry.

The production processes for polymers are classified into a batch type process and a continuous process in terms of a system, and are classified into, for example, a solution polymerization method, a suspension polymerization method, a bulk polymerization method, and a vapor phase polymerization method in terms of the form of a reaction system. In addition, a general process includes polymerizing a monomer with a polymerization catalyst to provide a polymer.

In association with the progress of a polymerization process, a reduction in production cost, resource savings and energy savings have started to become important challenges in process development. Important technological innovation in the reduction in production cost has heretofore been performed by dramatically increasing the amount of production of a polymer per hour through the development of a high-activity catalyst. For example, switchover to a non-deashing process or vapor phase process in the production of polyethylene or polypropylene can be said to be an example of the innovation. The recovery of a polymerization catalyst, an unreacted monomer, and a polymerization solvent after a polymerization reaction, thereby being recycled and re-used, is also effective in the reduction in production cost. JP 2000-063405 A (Patent Document 1) describes the following production method. In the slurry polymerization for producing polyethylene, a polymer is subjected to solid-liquid separation from a polymerization reaction liquid, and then the resultant recovered liquid is returned to a polymerization step, followed by recycling and re-use. It is difficult to separate and recover a high-activity titanium-based catalyst used as a polymerization catalyst while maintaining its catalytic activity, and the recycling and re-use of the recovered liquid are intended for its utilization as a polymerization solvent.

Meanwhile, the following attempt has been made in the polymerization of α-olefin such as ethylene or propylene. A polar group-containing monomer is copolymerized with olefin to impart various functions such as dyeability, adhesive property, and compatibility with engineering plastic to non-polar polyethylene or polypropylene.

There have been known examples proposed by Brookhalt (J. Am. Chem. Soc., 118, 267 (1996); Non-Patent Document 1), Nozaki (J. Am. Chem. Soc., 131, 14606 (2009); Non-Patent Document 2), et al. in each of which a catalyst made of a complex of a metal in Group 10 of the periodic table is used as a polymerization catalyst capable of copolymerizing olefin and a polar group-containing monomer. However, those complex catalysts have involved the following problem. The polymerization activity of each of the catalysts is low in spite of the fact that a precious late transition metal is used, and hence a ratio of a catalyst cost to a production cost is high in a conventional polymerization process, which is not economically commensurate.

PRIOR ART

Patent Documents

Patent Document 1: JP 2000-063405 A

Non-patent Documents

Non-patent Document 1: J. Am. Chem. Soc., 118, 267 (1996)
Non-patent Document 2: J. Am. Chem. Soc., 131, 14606 (2009)

DISCLOSURE OF THE INVENTION

Problems to be Solved by the Invention

An object of the present invention is to provide a novel polymerization process by which in a copolymerization reaction between an olefin and a polar group-containing monomer, a catalyst cost can be dramatically reduced even when the polymerization activity of a catalyst is relatively low.

Means to Solve the Problem

As a result of intensive studies to solve the problem, the inventors of the present invention have found that in a copolymerization reaction between olefin and at least one monomer represented by formula (1), a complex of a metal in Group 10 of the periodic table can be separated and recovered from a polymer without decomposition of the complex, its catalytic activity does not reduce even after being used as a catalyst, and the complex can be re-used without any special treatment. The inventors have confirmed that a catalyst cost can be dramatically reduced by recycling and re-using the catalyst. Thus, the inventors have completed the present invention.

That is, the present invention relates to the following items [1] to [7].

[1] A method of producing a polymer in the method for producing a copolymer of olefin and a polar group-containing monomer represented by formula (1):

$$C(R^1)_2=C(R^1)(C(R^1)_2)_n R^2 \quad (1)$$

(in the formula, three to five $R^1$'s may be identical to each other or different from each other, each representing a hydrogen atom or a hydrocarbon group having 1 to 5 carbon atoms; $R^2$ represents $-OR^{2-1}$, $-SR^{2-1}$, $-OCOR^{2-1}$ where $R^{2-1}$ represents a hydrogen atom or a hydrocarbon group having 1 to 18 carbon atoms, $-N(R^{2-2})_2$ where two $R^{2-2}$'s may be identical to each other or different from each other, each representing a hydrogen atom, a hydrocarbon group having 1 to 18 carbon atoms, $-COR^{2-3}$, or $-COOR^{2-3}$ where $R^{2-3}$ represents a hydrocarbon group having 1 to 10 carbon atoms, or a halogen atom; and n represents 0 or 1.), the method comprising using a complex of a metal in Group 10 of the periodic table as a catalyst; and supplying a catalyst solution separated from a polymer after the polymerization reaction to a polymerization reaction system to recycle and re-use the catalyst.

[2] The method of producing a polymer according to [1] above, wherein the supply of the catalyst solution separated from the polymer after the polymerization reaction to the polymerization reaction system to recycle and re-use the catalyst is carried out without any post-treatment.

[3] The method of producing a polymer according to [1] above, in which the catalyst made of the complex of the metal in Group 10 of the periodic table is represented by formula (C1):

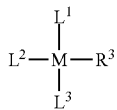

(C1)

(in the formula, M represents a metal atom in Group 10 of the periodic table; $L^1$ represents a group having a nitrogen atom (N), a phosphorus atom (P), or an arsenic atom (As) and bonded to M at the atom; $L^2$ represents a group having an oxigen atom (O) or a sulfur atom (S) and bonded to M at the atom; $L^3$ represents an electron-donating ligand; and $R^3$ represents a hydrogen atom, an acyloxy group, or a hydrocarbon group which has 1 to 30 carbon atoms and which may be substituted by one or more groups selected from a halogen atom, an alkoxy group, an aryloxy group and an acyloxy group).

[4] The method of producing a polymer according to [3] above, in which the catalyst represented by the general formula (C1) is represented by formula (C2):

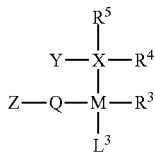

(C2)

(in the formula, M represents a metal atom in Group 10 of the periodic table; X represents a phosphorus atom (P) or an arsenic atom (As); $R^3$ represents a hydrogen atom, an acyloxy group, or a hydrocarbon group which has 1 to 30 carbon atoms and which may be substituted by one or more groups selected from a halogen atom, an alkoxy group, an aryloxy group and an acyloxy group; Y, $R^4$, and $R^5$ each independently represent a hydrogen atom, an alkoxy group, an aryloxy group, a silyl group, an amino group, or a hydrocarbon group which has 1 to 30 carbon atoms and which may be substituted by one or more groups selected from a halogen atom, an alkoxy group and an aryloxy group; $R^4$ and $R^5$ may be bonded to each other to form a ring structure; Q represents a divalent group represented in the following brackets "[ ]" in Z[—S(=O)$_2$—O-]M, Z[—C(=O)—O-]M, Z[—P(=O)(—OH)—O-]M, or Z[—S-]M where Z and M at the beginning and at the end of the formulae are described to show a bonding direction of the group); Z represents a hydrogen atom or a hydrocarbon which has 1 to 40 carbon atoms and which may be substituted by one or more groups selected from a halogen atom, an alkoxy group, and an aryloxy group; Y and Z may be bonded to each other to form a ring structure; $R^4$ and/or $R^5$ may be bonded to Y to form a ring structure; and $L^3$ represents an electron-donating ligand.)

[5] The method of producing a polymer according to [4] above, wherein the catalyst represented by formula (C2) is represented by formula (C3):

(C3)

(In the formula, $Y^1$ represents a divalent hydrocarbon group which has 1 to 70 carbon atoms and which may be substituted by one or more groups selected from a halogen atom, an alkoxy group, and an aryloxy group; and Q, M, X, $R^3$, $R^4$, $R^5$, and $L^3$ have the same meanings as in formula (C2).)

[6] The method of producing a polymer according to [5] above, in which the catalyst represented by (C3) is represented by formula (C4):

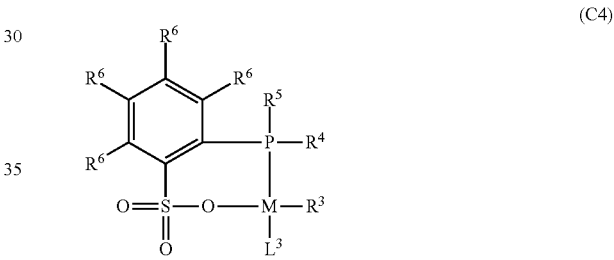

(C4)

(in the formula, four $R^6$'s each independently represent a hydrogen atom, an alkyl group having 1 to 8 carbon atoms, an alkoxy group having 1 to 8 carbon atoms, an aryloxy group having 6 to 18 carbon atoms, or a halogen atom; and M, $R^3$, $R^4$, $R^5$, and $L^3$ have the same meanings as in formula (C2).)

[7] The method of producing a polymer according to any one of [1] to [6] above, wherein part of a polymerization reaction liquid is continuously withdrawn from a polymerization reactor during the polymerization reaction of the monomer using a continuous polymerization reaction apparatus provided with the polymerization reactor and a solid-liquid separator; the catalyst solution and the polymer are separated in the solid-liquid separator; and the separated catalyst solution is returned to the polymerization reactor without being treated.

Effects of the Invention

According to the method of producing a polymer of the present invention including recycling and re-using a catalyst, a catalyst cost can be dramatically reduced even when the polymerization activity of the catalyst is relatively low, and hence a polar group-containing olefin-based polymer, which has been difficult to industrially produce by a conventional polymerization method owing to a high catalyst cost, can be produced at a low cost.

MODE FOR CARRYING OUT THE INVENTION

Figure 1:
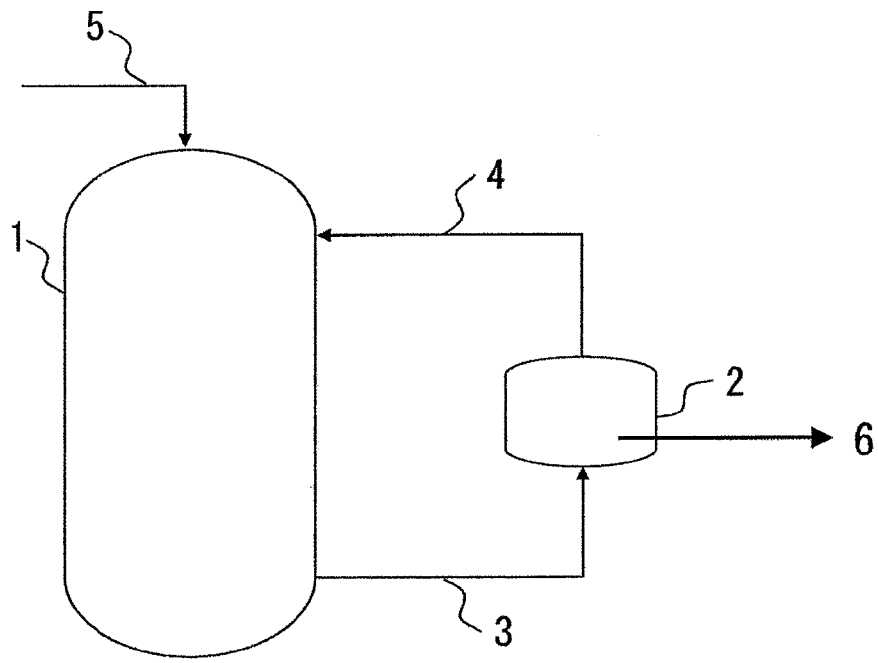
FIG. 1 is a flow chart illustrating an example of a continuous polymerization process of the present invention.

Hereinafter, a preferred embodiment of a novel method of producing a polymer according to the present invention is specifically described. It should be noted that in the present invention, the terms "polymerization" and "polymer" are used in such meanings as to comprehend "copolymerization" and "copolymer", respectively. In addition, the term "hydrocarbon" is used in such meaning as to comprehend saturated and unsaturated, aliphatic and alicyclic hydrocarbons and an aromatic hydrocarbon. The term "olefin" refers to a compound having a carbon-carbon double bond irrespective of the presence or absence of a polar group (provided that a monomer represented by formula (1) is excluded).

1. Mechanism for Recovery of Polymerization Catalyst

In order that a polymerization catalyst may be separated from a polymer, and then may be recycled and re-used without being subjected to any post-treatment, such difficult technological challenges as described below must be simultaneously solved: to chemically cleave a bond between a growing polymer chain and a metal complex catalyst, to physically separate the metal complex catalyst and the polymer, to allow the isolated complex catalyst to stably exist in a separation step and not to be decomposed, and to enable the reactivation of the complex catalyst under polymerization conditions.

The inventors of the present invention have earnestly tackled with the challenges. As a result, the inventors have found the following method of producing a polymer. A complex of a metal in Group 10 of the periodic table is used as a catalyst, and in a polymerization reaction between olefin and at least one monomer represented by formula (1), the metal complex catalyst is separated from a polymer, and is then recycled and re-used without being subjected to any post-treatment. It should be noted that the term "post-treatment" means, for example, a reactivation treatment or a washing operation.

The catalyst made of the complex of the metal in Group 10 of the periodic table is not particularly limited, but requires the incorporation of at least one monomer represented by formula (1) into a polymerization reaction system. Hereinafter, a catalyst recovery mechanism is described by taking, as an example, a monomer represented by formula (1) in which $R^1$ represents a hydrogen atom and a metal complex catalyst represented by formula (C1).

Polymerization proceeds while the monomer is inserted into the M-$R^3$ bond of the metal complex (C1).

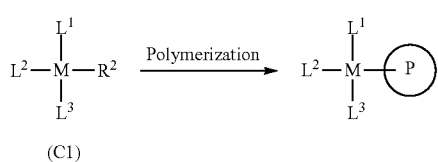

(C1)

A monomer represented by formula (1) in which n=0 undergoes head-to-tail insertion, and then the resultant is separated into a metal complex (C1-1) and a polymer having a double bond at a terminal thereof through a chain transfer reaction caused by the elimination of $R^2$. A monomer in which n=1 undergoes tail-to-head insertion, and then the resultant is separated into a metal complex (C1-1) and a polymer having a double bond at a terminal thereof through a chain transfer reaction caused by the elimination of $R^2$. The tail-to-head insertion is generally advantageous because the monomer represented by formula (1) has a polar group. Accordingly, the case of n=1 is preferred as the monomer represented by formula (1). The metal complex (C1-1) whose bond with a growing polymer has been cleaved can be separated from the polymer. The metal complex (C1-1) is stable against an external stimulus such as heat and impurities by virtue of the existence of a newly produced, stable M-$R^2$ bond and an electron-donating ligand $L^3$, and hence can stably exist even in the separation step.

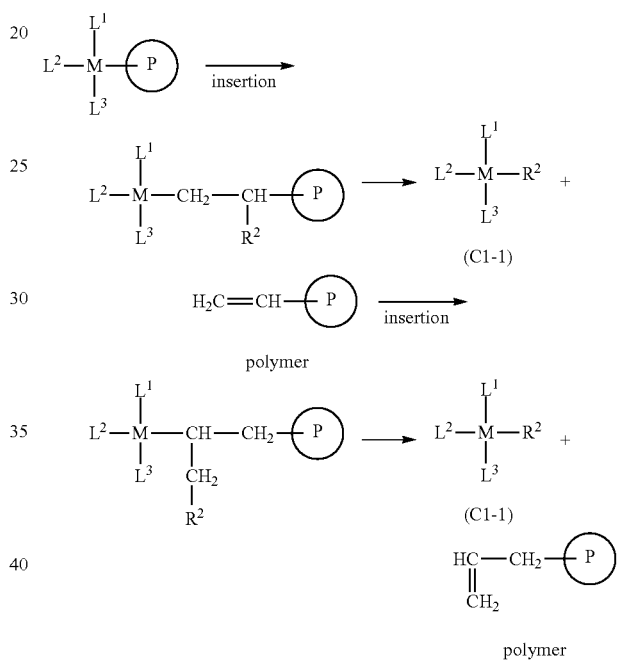

When the metal complex (C1-1) is returned to a reactor again after its separation from the polymer and then the reaction is performed, the complex is reactivated and hence the polymerization reaction resumes.

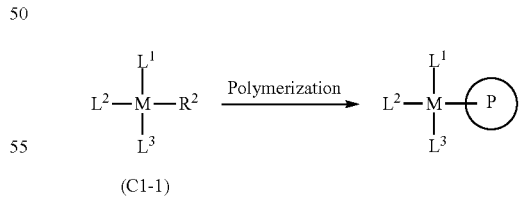

(C1-1)

In general, a β-hydride elimination reaction has been known as the manner in which a bond between a complex catalyst and a growing polymer is cleaved. In the case of the β-hydride elimination, however, a hydride complex to be generated is extremely unstable against an external stimulus such as heat or impurities, and hence the complex is difficult to be isolated and decomposes during the step of separation from the polymer. In addition, a method comprising adding a polymerization terminator or a chain transfer agent to cleave the bond between the complex catalyst and the growing polymer has been known as a post-treatment after the polymerization reaction. In the method, however, the stability of the catalyst after the chain transfer reaction, separation of the catalyst from the reaction terminator or the chain transfer agent, its reactivation after the termination of the reaction, and the like become challenges. In the present invention, the catalyst can be separated from the polymer, and then can be recycled and re-used without the addition of such a reaction terminator or chain transfer agent.

It has also been known that when a metal component of a catalyst remains in a large amount in a polymer, the component adversely affects the color and physical properties of the polymer. However, according to the method of the present invention, the amount of the metal remaining in the polymer can be reduced to an extremely low level in essence.

In addition, the polar group-containing monomer to be used in the present invention can be stably recovered and re-used even when used as a solvent in a polymerization system because the monomer is more excellent in stability against radical polymerization than a polar group-containing monomer such as acrylic ester to be generally used in coordinated anionic polymerization.

2. Monomer

In the method for producing a polymer of the present invention (polymerization process), at least one monomer represented by formula (1) is used and polymerized in combination with olefin.

$$C(R^1)_2\!=\!C(R^1)(C(R^1)_2)_n R^2 \quad (1)$$

In the formula, three to five $R^1$s may be the same or different from each other and each individually represents a hydrogen atom or hydrocarbon group having 1 to 5 carbon atoms; $R^2$ represents —$OR^{2\text{-}1}$, —$SR^{2\text{-}1}$, —$OCOR^{2\text{-}1}$ ($R^{2\text{-}1}$ represents a hydrogen atom or hydrocarbon group having 1 to 18 carbon atoms), —$N(R^{2\text{-}2})_2$ (two $R^{2\text{-}2}$s may be the same or different from each other and each individually represents a hydrogen atom, hydrocarbon group having 1 to 18 carbon atoms, —$COR^{2\text{-}3}$ or —$COOR^{2\text{-}3}$ ($R^{2\text{-}3}$ represents hydrocarbon group having 1 to 10 carbon atoms) or a halogen atom; and n is 0 or 1.

The group represented by $R^2$ is generally called "leaving group" and —$OCOR^{2\text{-}1}$ is particularly preferable. As the monomer represented by formula (1), specific examples of the monomer where n=0 include vinyl acetate, methyl vinyl ether, N-vinylformamide, N-vinylacetamide, vinyl chloride and vinyl bromide; and specific examples of the monomer where n=1 include allyl acetate, allyl alcohol, allyl amine, N-allylaniline, N-t-butoxycarbonyl-N-allylamine, N-benzyloxycarbonyl-N-allylamine, N-benzyl-N-allylamine, allyl chloride and allyl bromide. Among these, allyl acetate, allyl alcohol, N-allylaniline, N-t-butoxycarbonyl-N-allylamine, allyl chloride, allyl bromide and vinyl acetate are preferable, and allyl acetate is more preferable. These monomers represented by formula (1) may be used independently or two or more of them may be used in combination.

As the olefin to be copolymerized with the monomer represented by formula (1), olefin having 2 to 10 carbon atoms is preferable and 1-olefin having 2 to 10 carbon atoms is more preferable. Specific examples thereof include ethylene, propylene, 1-butene, 1-hexene, 4-methyl-1-pentene and 1-octene. Among these, ethylene and propylene are particularly preferable. One of these compounds may be used independently or two or more of them may be used in combination.

In addition to olefin and monomers represented by formula (1), other monomers may be incorporated to be copolymerized. The other monomers include acrylate ester, methacrylate ester, acrylonitrile and styrene.

Examples of the combination of olefin and the monomers represented by formula (1) include ethylene and allyl acetate; ethylene and ally alcohol; ethylene, allyl acetate and allyl alcohol; ethylene and allyl chloride; ethylene and allyl bromide; ethylene and allylamine, ethylene and N-allylaniline; ethylene and N-t-butoxycarbonyl-N-allylamine; ethylene and N-benzyloxycarbonyl-N-allylamine; ethylene and N-benzyl-N-allylamine; propylene and allyl acetate; propylene and ally alcohol; propylene, allyl acetate and allyl alcohol; propylene and allyl chloride; propylene and allyl bromide; propylene and allylamine; propylene and N-allylaniline; propylene and N-t-butoxycarbonyl-N-allylamine; propylene and N-benzyloxycarbonyl-N-allylamine; and propylene and N-benzyl-N-allylamine. Among these, preferred are ethylene and allyl acetate; ethylene and allyl alcohol; ethylene, allyl acetate and allyl alcohol; ethylene and allyl chloride; and ethylene and allylamine from the viewpoint of the polymer performance and economic efficiency.

3. Polymerization Catalyst

There is no particular limitation on the polymerization catalyst which can be used in the present invention as long as the catalyst is a transition metal complex of group 10 elements of the periodic table.

Among the transition metal complex of group 10 elements of the periodic system, the metal complex represented by formula (C1) is preferable.

(C1)

In the formula, M represents a metal atom of group 10 element in the periodic system; $L^1$ represents a group containing a nitrogen atom (N), a phosphorous atom (P) or an arsenic atom (As) which atom binds to M; $L^2$ represents a group containing an oxygen atom (O) or a sulfur atom (S) which binds to M; $L^3$ represents an electron-donating ligand; $R^3$ represents a hydrogen atom, acyloxy group, or hydrocarbon group having 1 to 30 carbon atoms which may be substituted by one or more groups selected from a halogen atom, alkoxy group, aryloxy group and acyloxy group.

M represents an element of group 10 in the periodic system. The elements of group 10 in the periodic system include Ni, Pd and Pt. From the viewpoint of the catalytic activity and obtained molecular weight, Ni and Pd are preferable, and Pd is more preferable.

$L^1$ represents a group containing a nitrogen atom (N), a phosphorous atom (P) or an arsenic atom (As) which atom binds to M. Here, $L^1$ in the present invention includes not only monodentate ligands which bind to M with one nitrogen atom (N), phosphorous atom (P) or arsenic atom (As) but also bidentate ligands which bind to M with two nitrogen atoms (N), phosphorous atoms (P) or arsenic atoms (As). Specific examples in which $L^1$ is a monodentate ligand are given below. "Ph" represents phenyl group.

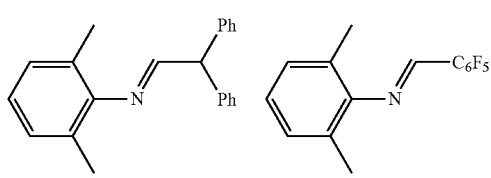

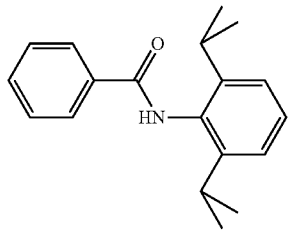

Specific examples in which $L^1$ is a bidentate ligand are given below.

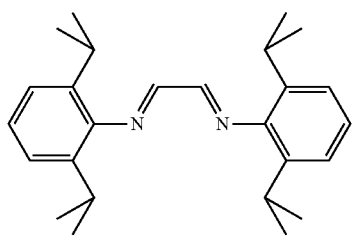

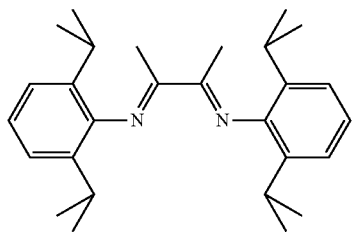

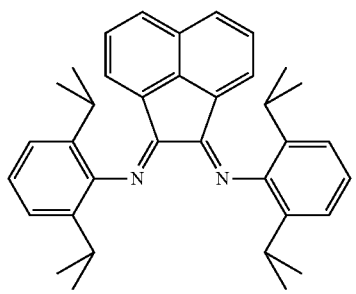

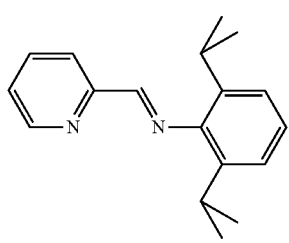

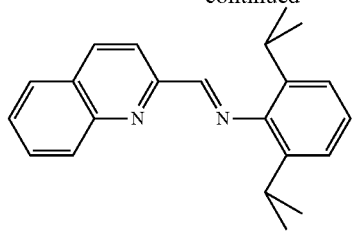

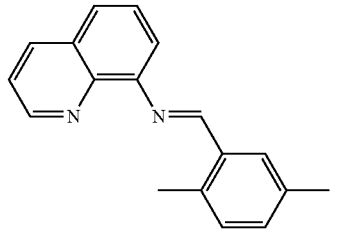

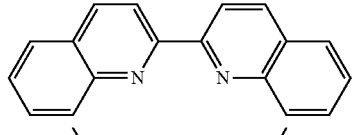

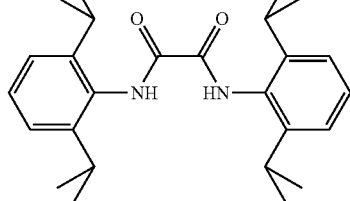

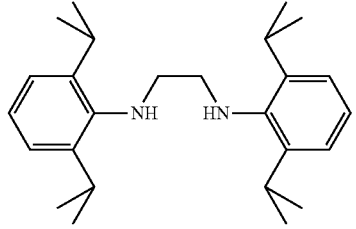

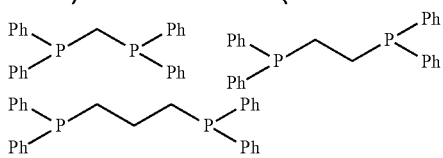

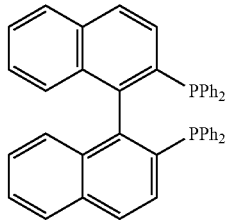

$L^2$ represents a group which binds to M with an oxygen atom (O) or a sulfur atom (S). That is, $L^2$ is a group having a structure such as —O—, —C(=O)—O—, —S(=O)$_2$—O—, —P(=O)(=OH)—O— and —S—. Examples of the group binding to M with an oxygen atom (O) include methoxy group, ethoxy group, phenoxy group, acetoxy group, trifluoroacetoxy group, mesyloxy group, benzene sulfonate group, tosyloxy group, trifluoromethanesulfonate group and pentafluorobenzenesulfonate group; and examples of the group binding to M with a sulfur atom (S) include methylthio group and phenylthio group.

$L^1$ and $L^2$ may crosslink with each other to form one bidentate ligand, and examples thereof are given below. M in the formulae represents an element of group 10 in the periodic system and the bonds other than those with the bidentate ligand are omitted from the formulae.

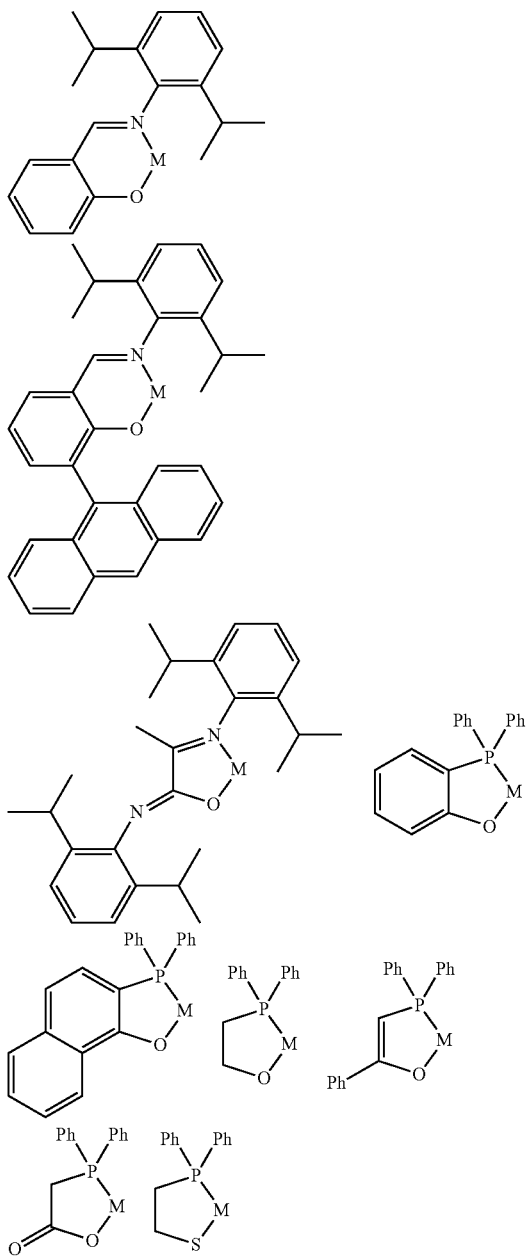

Electron-donating ligand $L^3$ is a compound having an electron-donating ability and is capable of stabilizing a metal complex by coordinating to metal atom M. As the electron-donating ligand ($L^3$), examples of those containing a sulfur atom include dimethyl sulfoxide (DMSO). Examples of those containing a nitrogen atom include trialkyl amine having 1 to 10 carbon atoms in alkyl group, dialkyl amine having 1 to 10 carbon atoms in alkyl group, pyridine, 2,6-dimethylpyridine (otherwise known as "lutidine"), aniline, 2,6-dimethylaniline, 2,6-diisopropylaniline, N,N,N',N'-tetramethylethylenediamine (TMEDA), 4-(N,N-dimethylamino)pyridine (DMAP), acetonitrile, benzonitrile and 2-methylquinoline. Examples of those containing an oxygen atom include diethyl ether, tetrahydrofuran and 1,2-dimethoxyethane.

$R^3$ represents a hydrogen atom, acyloxy group, or hydrocarbon group having 1 to 30 carbon atoms which may be substituted by one or more groups selected from a halogen atom, alkoxy group, aryloxy group and acyloxy group. Preferred acyloxy group is acetoxy group and pivaloxy group. Preferred hydrocarbon group having 1 to 30 carbon atoms which may be substituted by one or more groups selected from a halogen atom, alkoxy group, aryloxy group and acyloxy group is alkyl group having 1 to 6 carbon atoms. Preferred halogen atom is chlorine and bromine. Preferred alkoxy group is methoxy group and ethoxy group. Preferred aryloxy group is phenoxy group. Preferred acyloxy group is acetoxy group and pivaloxy group. Particularly preferable examples of $R^3$ include a hydrogen atom, acetoxy group, methyl group, ethyl group, n-propyl group, isopropyl group, methoxymethyl group, phenoxy methyl group, 1-acetoxyphenyl group and 1-pivaloxypropyl group.

As a metal complex represented by formula (C1), the metal complex represented by formula (C2) is preferable.

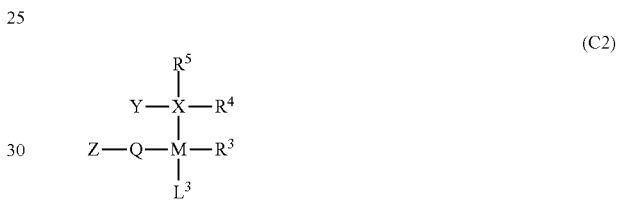

(C2)

In the formula, M represents a metal atom of group 10 element in the periodic system; X represents a phosphorous atom (P) or an arsenic atom (As); $R^3$ represents a hydrogen atom, acyloxy group, or hydrocarbon group having 1 to 30 carbon atoms which may be substituted by one or more groups selected from a halogen atom, alkoxy group, aryloxy group and acyloxy group; Y, $R^4$ and $R^5$ independently represent a hydrogen atom, alkoxy group, aryloxy group, silyl group, amino group or hydrocarbon group having 1 to 30 carbon atoms which may be substituted by one or more groups selected from a halogen atom, alkoxy group and aryloxy group; and $R^4$ and $R^5$ may bond to each other to form a ring structure. Q represents a bivalent group indicated in the brackets of Z[—S(=O)$_2$—O-]M, Z[—C(=O)—O-]M, Z[—P(=O)(—OH)—O-]M or Z[—S-]M (Z and M at the beginning and at the end of the formulae are described to show the coupling direction of the groups). Z represents a hydrogen atom or a hydrocarbon group having 1 to 40 carbon atoms which may be substituted by one or more groups selected from a halogen atom, alkoxy group and aryloxy group. Y and Z may bond to each other to form a ring structure. $R^4$ and/or $R^5$ may bond to Y to form a ring structure. $L^3$ represents an electron-donating ligand.

The structure of formula (C2) is described below.

M, $L^3$ and $R^3$ have the same meanings as in formula (C1).

X represents a phosphorous (P) atom or an arsenic (As) atom, wherein two electrons coordinate to M. A phosphorous (P) atom is preferred as X for reasons of availability and the catalyst cost.

Y, $R^4$ and $R^5$ independently represent a hydrogen atom, alkoxy group, aryloxy group, silyl group, amino group, or a hydrocarbon group having 1 to 30 carbon atoms which may be substituted by one or more groups selected from a halogen atom, alkoxy group and aryloxy group. Preferred alkoxy group is the one having 1 to 20 carbon atoms, including methoxy group, ethoxy group, propoxy group and isopropoxy group. Preferred aryloxy group is the one having 6 to 24 carbon atoms, including phenoxy group. Examples of silyl group includes trimethylsilyl group and examples of amino group include amino group, methylamino group and dimethylamino group. $R^4$ and $R^5$ may be the same or different from each other. $R^4$ and $R^5$ may bond to each other to form a ring structure. $R^4$ and/or $R^5$ may bond to Y to form a ring structure.

Examples of the hydrocarbon group having 1 to 30 carbon atoms which may be substituted by one or more groups selected from a halogen atom, alkoxy group and aryloxy group in Y, $R^4$ and $R^5$ include alkyl group, aryl group, cycloalkyl group and furyl group. Specific examples of the alkoxy group and aryloxy group in the hydrocarbon group having 1 to 30 carbon atoms which may be substituted by one or more groups selected from a halogen atom, alkoxy group and aryloxy group include those mentioned as the examples in $R^3$. The halogen atom is preferably fluorine. From the viewpoint of the catalyst activity, alkyl group and aryl group are particularly preferable.

Specific examples of Y—X—$R^4$, $R^5$ moiety when X is P (a phosphorous atom) are given below.

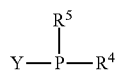

In the following structure formulae, the bond between P and M or $Y^1$ is not shown and "Me" represents methyl group.

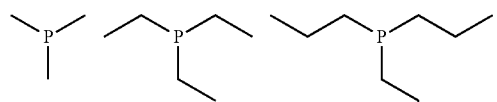

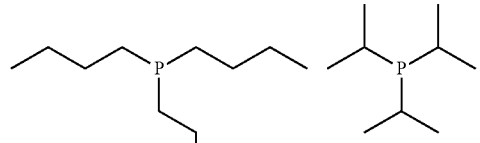

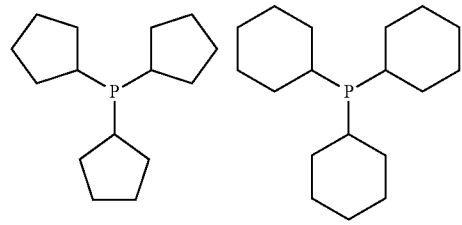

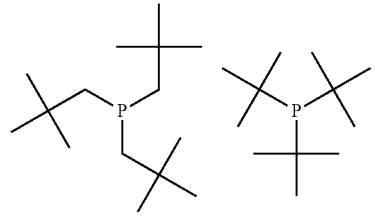

-continued

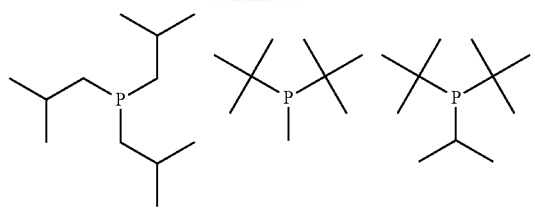

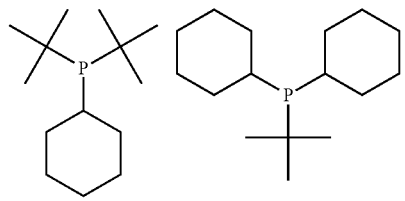

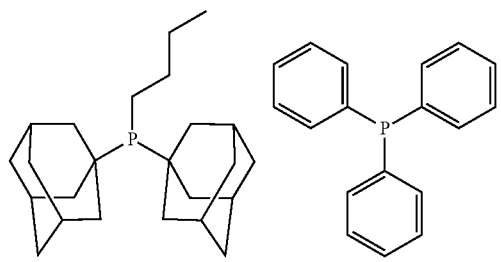

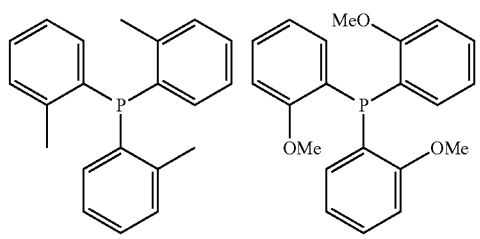

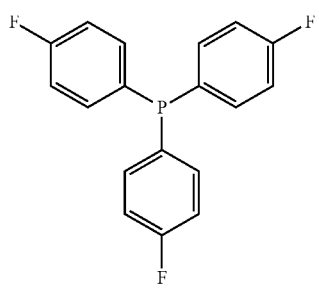

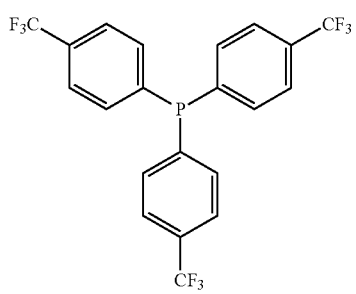

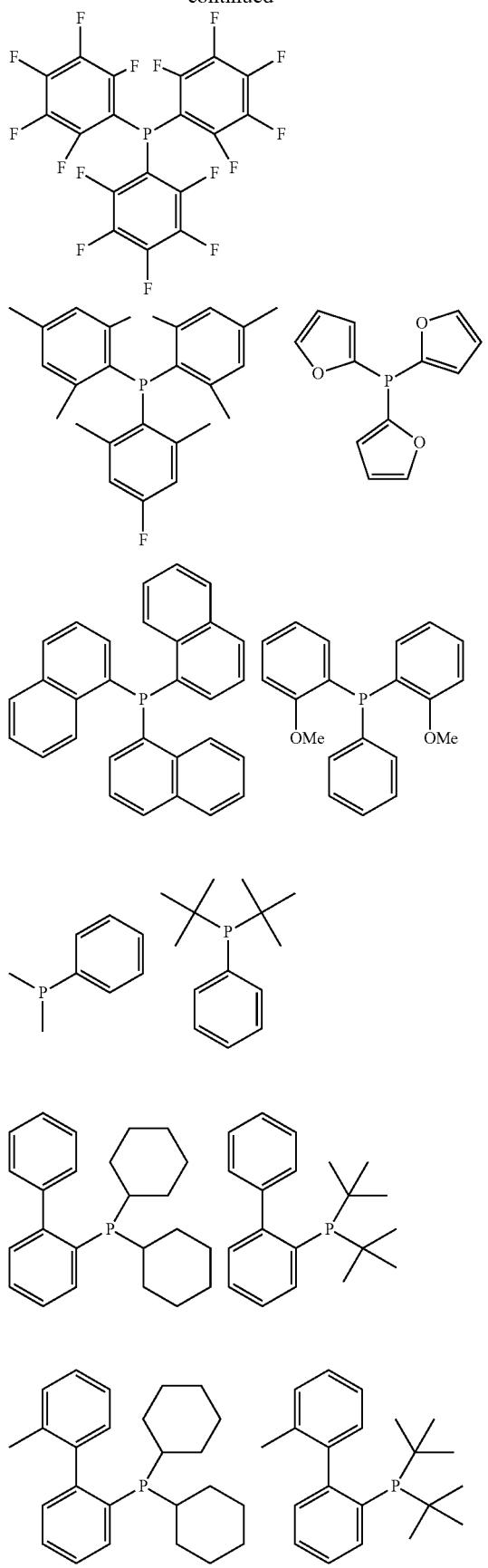
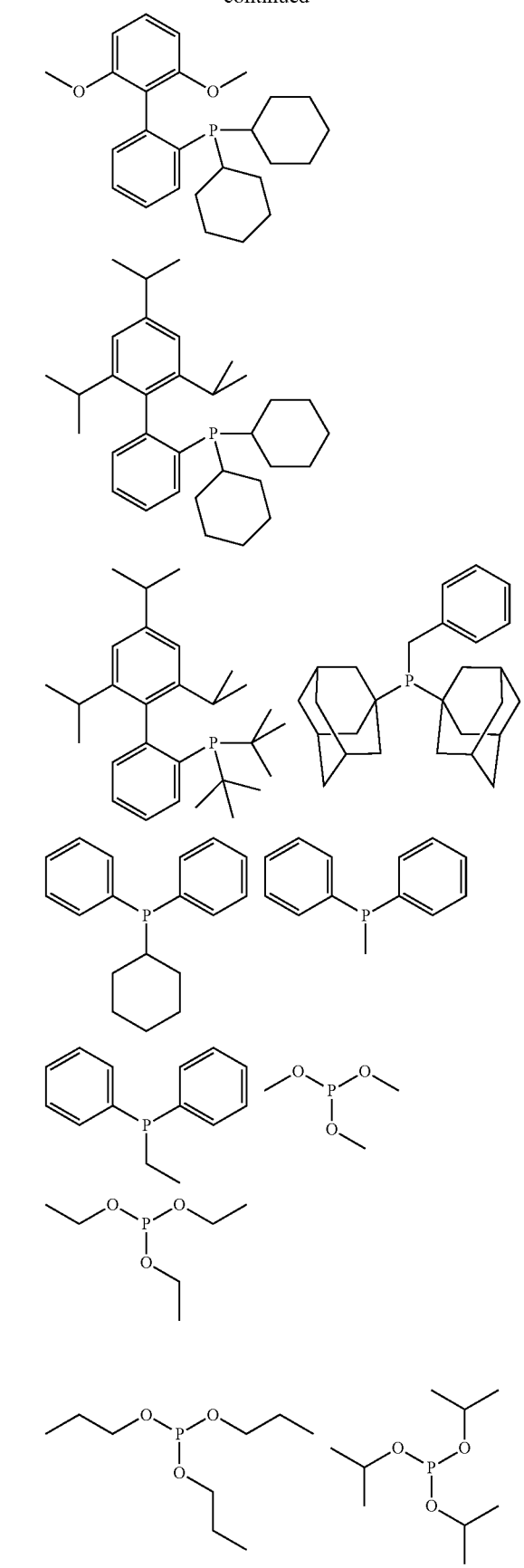

-continued

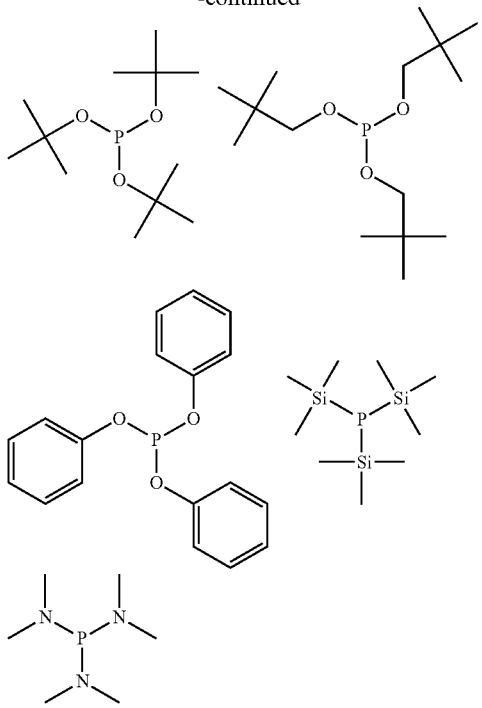

Specific examples of Y—X—R⁴, R⁵ moiety when X is As (an arsenic atom)

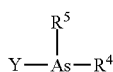

are given below.

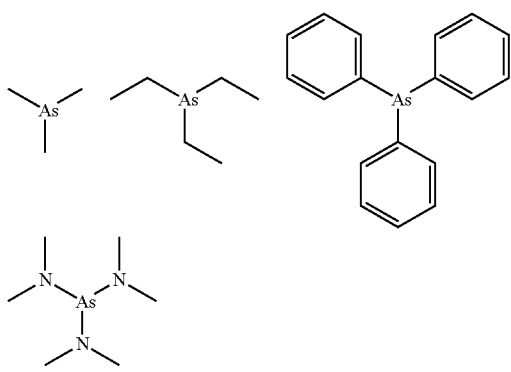

Q represents a bivalent group indicated by —S(=O)₂—O—, —C(=O)—O—, —P(=O)(—OH)—O— or —S—, which is a moiety, wherein a single electron coordinates to M. The left end of each of the above-mentioned formulae bonds to Z while the right end bonds to M. Among these, —S(=O)₂—O— is particularly preferable from the viewpoint of the catalyst activity.

Z represents a hydrogen atom or a hydrocarbon group having 1 to 40 carbon atoms which may be substituted by one or more groups selected from a halogen atom, alkoxy group and aryloxy group. Y and Z may bond to each other to form a ring structure. Specific examples of the halogen atom, alkoxy group and aryloxy group in the "hydrocarbon atom having 1 to 40 carbon atoms which may be substituted by one or more groups selected from a halogen atom, alkoxy group and aryloxy group" include those mentioned as the examples in Y, R⁴ and R⁵. Examples of hydrocarbon atom having 1 to 40 carbon atoms include methyl group, ethyl group, isopropyl group, t-butyl group, isobutyl group, cyclohexyl group, cyclopentyl group, phenyl group, 2-i-propylphenyl group, and 2,6-di-i-propylphenyl group.

A single electron of a highly electronegative oxygen or sulfur atom of Z-Q moiety coordinates to metal atom M. Since the bonding electron between Z-Q-M is transferred from M to Z-Q, Z-Q and M may be indicated formally as an anion state and a cation state, respectively.

In formula (C2), Y moiety and Z moiety may bond to each other. In this case, formula (C2) can be represented by formula (C3). In formula (C3), Y—Z moiety as a whole is indicated by Y¹. Here, Y¹ represents a cross-linked structure between Q and X.

(C3)

In the formula, Y¹ represents a bivalent hydrocarbon group having 1 to 70 carbon atoms which may be substituted by one or more groups selected from a halogen atom, alkoxy group and aryloxy group. Q, M, X, R³, R⁴, R⁵, L and q have the same meanings as in formula (C2).

Specific examples of a halogen atom, alkoxy group and aryloxy group as Y¹ are the same as those as Y. Examples of the hydrocarbon group having 1 to 70 carbon atoms include alkylene group and arylene group. Particularly preferred is arylene group.

Examples of [(R⁴)(R⁵)P] moiety when X is P (a phosphorous atom) include the following structures. In the following structure formulae, the bond between P and M or Y¹ is not shown. "ⁱPr" represents isopropyl group and "tBu" represents tert-butyl group.

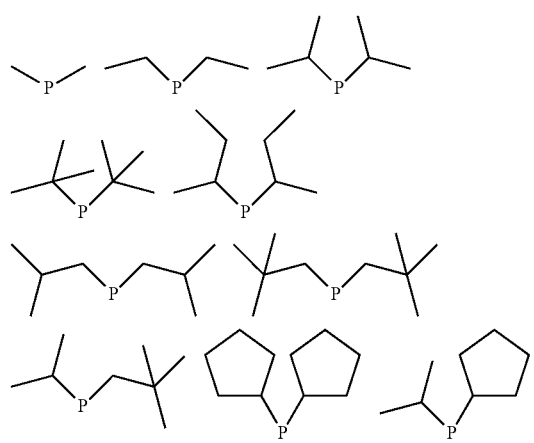

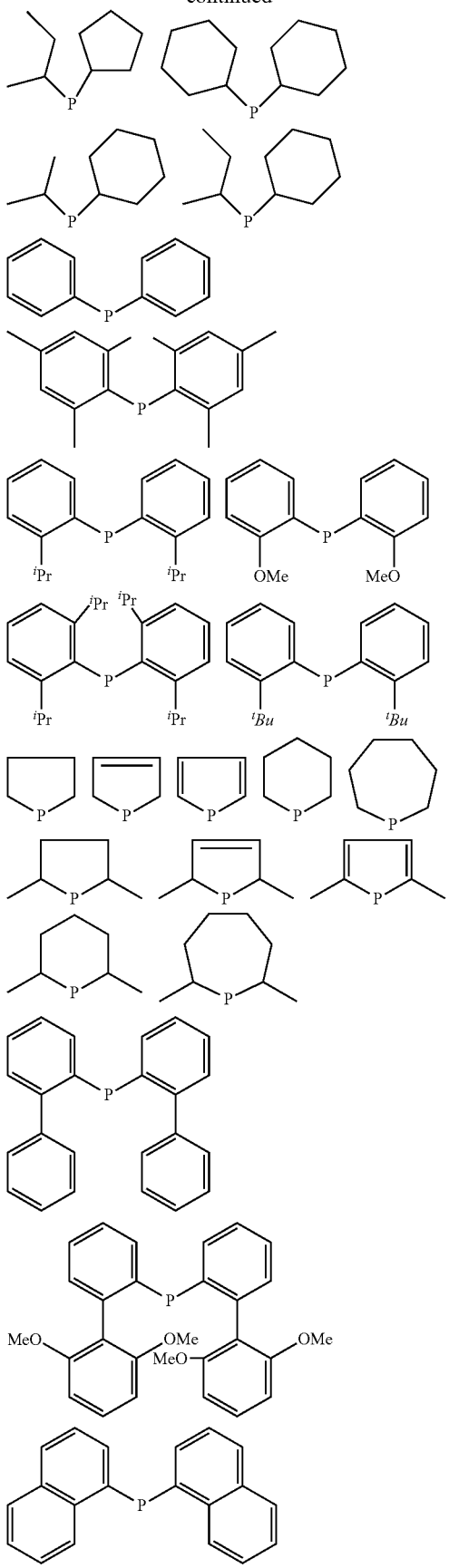

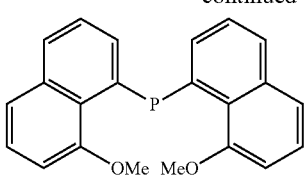

The cross-linked structure $Y^1$ is the crosslinking moiety which binds X and Q moiety. Specific examples of the cross-linked structure $Y^1$ in which X is represented by a P atom are shown below. Here, multiple $R^7$s may be the same or different to each other and represent a hydrogen atom, halogen atom, hydrocarbon group having 1 to 20 carbon atoms, or a hydrocarbon group having 1 to 20 carbon atoms substituted by a halogen atom.

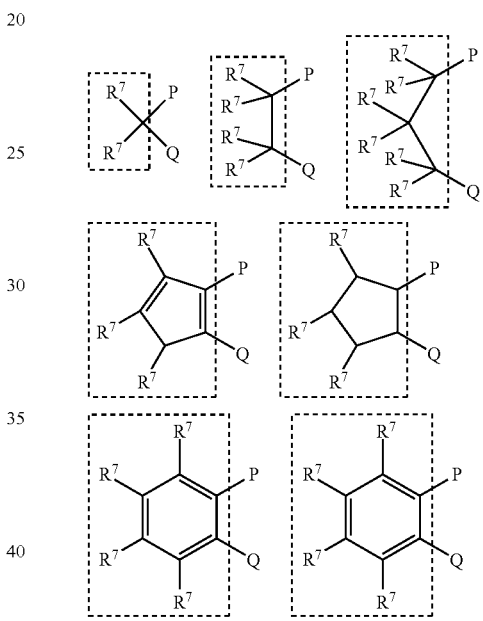

Substituents $R^4$ and $R^5$ may bond to $Y^1$ moiety to form a ring structure. Specific examples include the structures as follows:

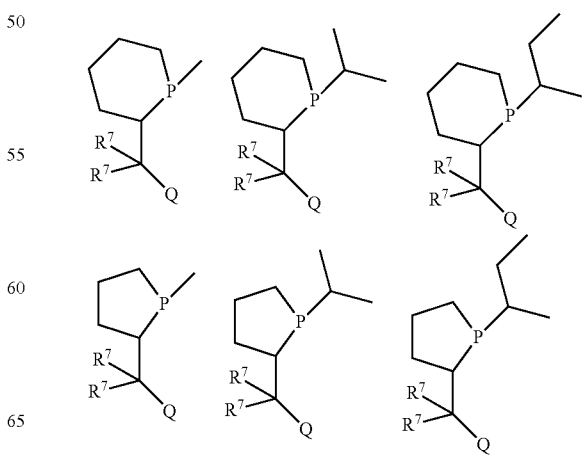

-continued

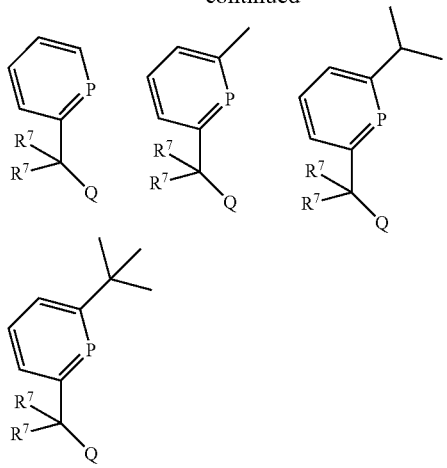

Among the catalysts represented by formula (C3), those represented by the following formula (C4) are particularly preferable.

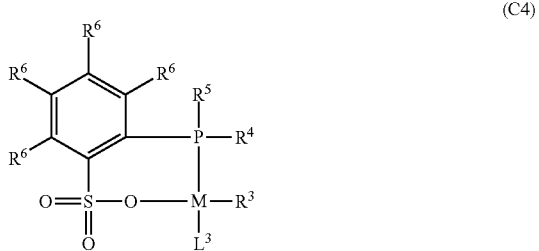

(C4)

In the formula, four $R^6$s independently represent a hydrogen atom, alkyl group having 1 to 8 carbon atoms, alkoxy group having 1 to 8 carbon atoms, aryloxy group having 6 to 18 carbon atoms or halogen atom; and M, $R^3$, $R^4$, $R^5$ and $L^3$ have the same meanings as those in formula (C2).

In formula (C4), preferred $R^3$ is an alkyl group having 1 to 6 carbon atoms, particularly methyl group. Both of $R^4$ and $R^5$ are preferably a cyclohexyl group, cyclopentyl group or isopropyl group. M is preferably Pd.

The metal complex of the catalysts represented by formulae (C2) and (C3) can be synthesized according to the known documents (for example, J. Am. Chem. Soc. 2007, 129, 8948). That is, a metal complex is synthesized by reacting zerovalent or bivalent M source with a ligand in formula (C2) or (C3).

The compound represented by formula (C4) can be synthesized by making $Y^1$ and Q in formula (C3) a specific group corresponding to formula (C4).

Examples of zerovalent M source include tris(dibenzylidene acetone) dipalladium as a palladium source and tetracarbonyl nickel(0) (Ni(CO)$_4$) and bis(1,5-cyclooctadiene)nickel as a nickel source.

Examples of bivalent M source include (1,5-cyclooctadiene)(methyl)palladium chloride, palladium chloride, palladium acetate, bis(acetonitrile)dichloropalladium (PdCl$_2$(CH$_3$CN)$_2$), bis(benzonitrile)dichloropalladium (PdCl$_2$(PhCN)$_2$), (N,N,N',N'-tetramethylethylenediamine)dichloro palladium(II)(PdCl$_2$(TMEDA)), (N,N,N',N'-tetramethylethylenediamine)dimethyl palladium (II) (PdMe$_2$(TMEDA)), palladium(II) bis(acetylacetonate) (Pd(acac)$_2$), palladium(II) trifluoromethanesulfonate (Pd(OCOCF$_3$)$_2$) as a palladium source and (allyl)nickel chloride, (allyl)nickel bromide, nickel chloride, nickel acetate, nickel(II) bis(acetylacetonate) (Ni(acac)$_2$), (1,2-dimethoxyethane)dichloronickel(II) (NiCl$_2$(DME)) and nickel(II) trifluoromethanesulfonate (Ni(OSO$_2$CF$_3$)$_2$) as a nickel source.

While an isolated metal complex represented by formula (C2), (C3) or (C4) can be used, the metal complex generated by bringing a M-containing metal source into contact with a ligand precursor and an electron-donating ligand ($L^3$) in the reaction system can also be used for in-situ polymerization without isolating the metal complex.

In this case, a ligand precursor represented by formula (C2) can be represented by formulae (C2-1) and (C2-2).

Symbols in the formula have the same meanings as mentioned above.

Symbols in the formula have the same meanings as mentioned above.

A ligand precursor represented by formula (C3) can be represented by the following formula (C3-1).

(C3-1)

Symbols in the formula have the same meanings as mentioned above.

In formula (C2), it is preferable to select the ratio between the M source (M) and a ligand precursor (C2-1) (X) or a ligand precursor (C2-2) (Z) (i.e. X/M or Z/M) or the ratio between the M source (M) and a ligand precursor (C3-1) (C3 ligand) (i.e. (C3 ligand)/M) within the range of from 0.5 to 2.0, more preferably from 1.0 to 1.5.

When isolating the metal complex of formula (C2), (C3) or (C4), the one stabilized by making an electron-donating ligand ($L^3$) coordinate to the metal complex in advance may be used.

4. Method for Producing Polymer

The method for producing the polymer of the present invention comprises process (I) of performing polymerization reaction using a metal complex catalyst and process (II) of separating polymer from the polymerization reaction solution, returning the recovered solution containing the metal complex catalyst to the polymerization reactor without post-treatment for cyclical reuse of the catalyst solution. The production method of the present invention can be performed in either of a batch mode in which the catalyst solution is recovered after the termination of the polymerization reaction to be reused in the subsequent polymerization reaction; and a continuous mode in which while part of the polymerization reaction solution is withdrawn during the polymerization reaction, the recovered solution obtained by separating the catalyst and polymer is returned to the polymerization reactor.

4-1. Polymerization Reaction Process (I)

There are no particular limitations on the polymerization mode and it may be any one of a solution polymerization, a suspension polymerization, vapor-phase polymerization and a bulk polymerization. The present invention does not depend on the polymerization mode, but a solution polymerization method, a suspension polymerization method and a bulk polymerization method are preferable from the viewpoint of the polymerization efficiency. From the viewpoint of the separation of the catalyst solution and polymer, it is preferable that the generated polymer precipitates without being dissolved in the polymerization solvent and monomers at least when the solution is cooled from the temperature at the time of polymerization. In this case, the liquid in which the polymer and catalyst are dissolved (recovered solution) can be isolated by a simple operation such as filtration. In the case where the generated polymer is dissolved in the solution, the polymer can be separated by a method such as reprecipitation and evaporation of a solvent and unreacted monomers.

The polymerization reaction can be performed either by a single stage polymerization or a multistage polymerization.

It is necessary that the monomers to be used include at least one monomer represented by formula (1). These monomers can be used singly or in combination with several monomers. In the case of the batch mode, it is also possible to separate the catalyst solution and polymer by polymerizing olefin other than the one represented by formula (1) and adding the monomer represented by formula (1) to the polymerization reactor at the end of the reaction.

The molar ratio between the metal complex catalyst represented by formula (C1), (C2), (C3) or (C4) and the total amount of monomers (monomers/metal complex) is within the range of from 1 to 10,000,000, preferably the range of from 100 to 1,000,000.

There are no particular limitations on the polymerization temperature. The polymerization is generally conducted at a temperature in the range of from −30 to 300° C., preferably in the range of from −30 to 200° C., more preferably in the range of from 0 to 180° C. and the most preferably in the range of from 20 to 150° C.

There are no particular limitations on the polymerization pressure. Though the polymerization pressure depends on the properties of the material monomers, the polymerization is conducted at a polymerization pressure in the range from normal pressure to ultrahigh pressure of 300 MPa or more. The polymerization is conducted at a pressure preferably in the range from normal pressure to 20 MPa, more preferably in the range from normal pressure to 10 MPa.

The polymerization time can be appropriately adjusted by the polymerization activity of the catalyst in the case of a batch mode, and can be as short as several minutes or as long as several hundred hours. In the case of the continuous mode, the residence time can be as short as several minutes or as long as several tens of hours. Repeating the cyclical use of the catalyst enables several thousand hours of continuous operation.

It is preferable to perform polymerization under an inert gas atmosphere to prevent the decrease in the catalyst activity. In the case of the solution polymerization, an inert solvent may be used in addition to monomers. There are no particular limitations on the inert solvent, and examples include aliphatic hydrocarbon such as isobutane, pentane, hexane, heptane, octane, decane and dodecane; alicyclic hydrocarbon such as cyclopentane, cyclohexane and methylcyclopentane; aromatic hydrocarbon such as benzene, toluene and xylene; halogenated hydrocarbon such as chloroform, methylene chloride, carbon tetrachloride, dichloroethane and tetrachloroethane, chlorobenzene, dichlorobenzene and trichlorobenzene; aliphatic ester such as methyl acetate and ethyl acetate; and aromatic ester such as methyl benzoate and ethyl benzoate. One of these solvents may be used independently or two or more of them may be used in combination.

4-2. Cyclical Use Process (II)

There are no particular limitations on the method for separating polymer from the polymerization reaction solution containing a metal complex catalyst and common separation methods may be employed. Examples thereof include centrifugation, filtration and sedimentation separation. From the viewpoint of separation efficiency and the process time, centrifugation separation and filtration separation are preferable.

The recovered solution obtained by separating the catalyst and polymer contains a solvent, metal complex catalyst (C1-1), unreacted monomers and the like. Metal complex catalyst (C1-1) means the catalyst in which $R^3$ of the original metal complex catalyst C1 and the like is substituted with $R^2$ of the monomer represented by formula (1) as explained in the above-mentioned "1. Mechanism for recovery of polymerization catalyst". All or part of the recovered solution can be returned to the polymerization reactor to be used for polymerization reaction. In this case, polymerization monomer in an amount of the monomer consumed during the polymerization reaction, an inert solvent and a metal complex catalyst may be added as needed. Since metal complex catalyst (C1-1) in the recovered solution is stable against the external stimuli such as heat and against impurities, a method of temporarily storing metal complex catalyst (C1-1) under inert atmosphere in a catalyst storage tank and returning it to the polymerization reactor as needed to be used can also be employed.

FIG. 1 shows an example of a continuous reactor provided with a process of cyclical use of a catalyst. Material monomers, metal complex catalyst (and an inert solvent as needed) are supplied to polymerization reactor 1 from material inlet 5. During the polymerization reaction, the polymerization reaction solution is withdrawn continuously or intermittently as polymer slurry 3, sent to a solid-liquid separator 2 and separated into catalyst recovered solution 4 and polymer. The obtained recovered solution 4 is again returned to the polymerization reactor to be used for polymerization. Monomers consumed during the reaction can be appropriately supplied from the material inlet.

EXAMPLES

Hereinafter, the present invention is described in greater detail by referring to Examples and Comparative Examples. The present invention is by no means limited thereto.

[Method for Analyzing the Polymer Structure]

The structure of the copolymers obtained in Examples was determined by various analyses of the NMR spectra using JNM-EX400 manufactured by JEOL Ltd. The content of the monomer unit derived from the monomer represented by formula (1) was determined by analyzing $^1$H-NMR spectrum at 80° C. using deuterated benzene as a solvent.

A number average molecular weight and a weight average molecular weight were calculated by size extrusion chromatography in which polystyrene is employed as an internal standard substance using a high-temperature GPC apparatus, HLC-8121GPC/HT, manufactured by Tosoh Corporation, provided with AT-806MS column (two columns arranged in series) manufactured by SHOWA DENKO K. K. (solvent: 1,2-dichlorobenzene, temperature: 145° C.)

[Method for Determining Quantity of the Residual Catalyst in the Polymer and Filtrate]

With respect to copolymers, 0.1 g of a copolymer was weighed, heated in 2 ml of sulfuric acid and carbonized. Nitric acid was added thereto till a more transparent solution was obtained to thereby decompose the carbide. After cooling the solution, 1 ml of nitric acid and 3 ml of hydrochloric acid were added thereto and the solution was heated until it turns colorless or pale yellow. After taking samples of 50 ml of the obtained solution, the quantity of Pd as a catalyst constituent was determined by an ICP mass spectrometer (SPQ9000, manufactured by SII Nanotechnology Inc.) to determine the residual catalyst amount. With respect to filtrate, 1 ml of the filtrate was measured off and after allowing the volatile components to evaporate, the residual catalyst amount was determined in the same way as in the case of the copolymer.

Synthesis Example 1

Metal complex catalyst 1 was synthesized according to the following reaction scheme:

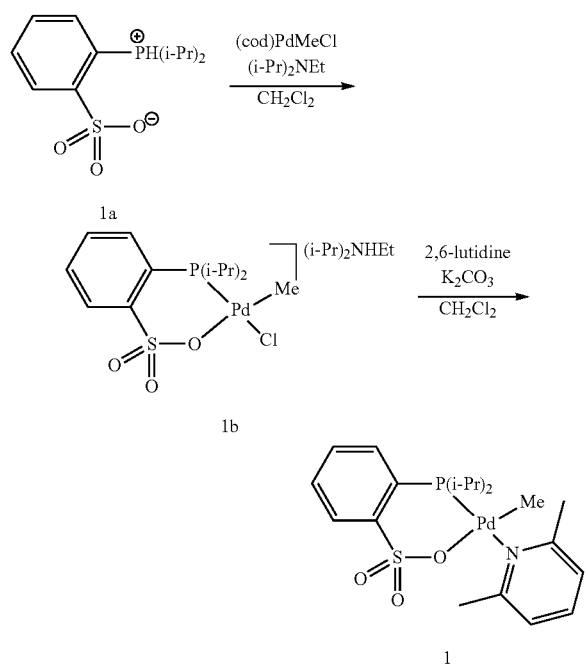

[Synthesis of Compound 1a]

n-Butyllithium (manufactured by Kanto Chemical Co., Inc., 1.57 M hexane solution, 174 ml, 274 mmol) was added to a tetrahydrofuran (THF) solution (400 ml) of benzenesulfonic acid (manufactured by Sigma-Aldrich, 21.7 g, 137 mmol) at 0° C. under nitrogen atmosphere and the mixture was stirred for three hours at room temperature. After cooling the reaction container to −78° C., chlorodiisopropylphosphine (manufactured by Sigma-Aldrich, 19.0 g, 125 mmol) was added thereto at −78° C. and stirred for 2.5 hours at room temperature. After ceasing the reaction by trifluoroacetic acid (manufactured by Tokyo Chemical Industry Co., Ltd., 15.6 g, 137 mmol), the generated precipitate was recovered by filtration and dried under reduced pressure to obtain phosphonium sulfonate 1a. The yield was 26.8 g (78%).

$^1$H-NMR (400 MHz, CDCl$_3$): δ 1.25 (d, J=18.0 Hz, 6H), 1.53 (dd, J=21.0, 6.6 Hz, 6H), 3.45 (br, 2H), 5.72 (br d, $^1$J$_{PH}$=380 Hz, 1H), 7.62-7.65 (m, 2H), 7.85 (br s, 1H), 8.29 (br s, 1H)

[Synthesis of Metal Complex 1b]

A methylene chloride solution (75 ml) of (cod)PdMeCl (synthesized according to "Inor. Chem., 1993, 32, 5769-5778; cod: 1,5-cyclooctadiene; 16.3 g; 61.5 mmol) was added to a methylene chloride solution (200 ml) of 2-(diisopropylphosphino)benzenesulfonic acid 1a (16.3 g, 59.3 mmol) and diisopropylethylamine (manufactured by Wako Chemical Pure Chemical Industries Ltd.; 38.3 g, 296 mmol) under argon atmosphere and the mixture was stirred for 2.5 hours at room temperature. Subsequently, the solution was condensed. The residue was determined to be Metal complex 1b by analyzing $^1$H-NMR spectrum and the mass was found to be 33.7 g (>99%).

$^1$H-NMR (400 MHz, CDCl$_3$):δ 0.69 (s, 3H, PdCH$_3$), 1.19-1.45 (m, 27H), 2.53 (sept, J=7.1 Hz, 2H), 3.18 (br., 2H, HNCH$_2$CH$_3$), 3.82 (br., 2H, HNCH(CH$_3$)$_2$), 7.42-7.59 (m, 3H), 8.22 (d, J=3.6 Hz, 1H), 9.37 (br s, 1H, NH)

[Synthesis of Metal Complex Catalyst 1]

A methylene chloride solution (200 ml) of complex 1b (33.7 g, 58.5 mmol) was added to a methylene chloride suspension (500 ml) of potassium carbonate (80.8 g, 585 mmol) and 2,6-lutidine (manufactured by Tokyo Chemical Industry Co., Ltd., 62.7 g, 585 mmol) under nitrogen atmosphere and stirred for 2.5 hours at room temperature. Solid remained after distilling away the solvent under reduced pressure was extracted with methylene chloride. The extract was filtered through Celite (dry diatom earth) and slowly added to hexane (200 ml). The generated metal complex catalyst 1 was collected by filtration, washed with hexane and then dried under reduced pressure. The yield was 27.6 g (94%).

$^1$H-NMR (400 MHz, CDCl$_3$): δ 0.35 (s, 3H, PdCH$_3$), 1.28 (dd, J=14.8, 6.8 Hz, 6H), 1.36 (dd, J=17.4, 6.6 Hz, 6H), 2.54-2.63 (m, 2H), 3.18 (s, 6H, CH$_3$ of lutidine), 7.13 (d, J=7.2 Hz, 2H), 7.45-7.61 (m, 4H), 8.31 (m, 1H)

Example 1

Cyclical Use of a Metal Complex Catalyst in the Copolymerization Reaction of Allyl Acetate and Ethylene Metal complex catalyst 1 (0.050 mmol) was dissolved in allyl acetate (75.0 ml, 69.8 g, 696 mmol) and added into a 120 ml-volume autoclave under nitrogen atmosphere. After filling the autoclave with ethylene (4.0 MPa), the content of the autoclave was stirred at 80° C. for two hours to carry out the copolymerization reaction (polymerization reaction 1-1). After reducing the ethylene pressure, the polymerization reaction solution was cooled to room temperature, and the polymer was precipitated from the polymerization reaction solution. The polymerization reaction solution as a slurry solution of the polymer was suction-filtered under nitrogen atmosphere to thereby be separated into the filtrate, which contains the metal complex catalyst, and the polymer, and the polymer was dried under reduced pressure. The yield of the isolated polymer (polymer 1-1) was 1.94 g and the polymer productivity per catalyst was 38.9 g/mmol-catalyst. The number average molecular weight and weight average molecular weight of the copolymer were calculated 10,000 and 21,000, respectively, by size exclusion chromatography. The allyl acetate content in the copolymer was determined 4.4 mol % by analyzing $^1$H-NMR spectrum. By the analysis of $^1$H-NMR spectrum of the filtrate, the catalyst in the filtrate was found to be a metal complex catalyst (C1-1) having a structure that the Pd-Me bonding moiety of metal complex catalyst 1 was substituted by a Pd—OAc bond. The quantity of Pd as a catalyst constituent contained in the filtrate and polymer was determined by the ICP mass spectrometry, and it was found that 99% of the charged amount of the catalyst was contained in the filtrate.

The recovered solution obtained by filtration was supplied again to the 120 ml-volume autoclave and allyl acetate was replenished so that the total solution amount becomes 75.0 ml. After filling the autoclave with ethylene (4.0 MPa), the content of the autoclave was stirred at 80° C. for two hours to carry out the copolymerization reaction (polymerization reaction 1-2). After reducing the ethylene pressure, the polymerization reaction solution was cooled to room temperature, and the polymer was precipitated from the polymerization reaction solution. The polymerization reaction solution as a slurry solution of the polymer was suction-filtered under nitrogen atmosphere to thereby be separated into the filtrate, which contains the metal complex catalyst, and the polymer, and the polymer was dried under reduced pressure. The yield of the isolated polymer (polymer 1-2) was 0.99 g and the polymer productivity per catalyst was 19.7 g/mmol-catalyst. The number average molecular weight and weight average molecular weight of the copolymer were calculated 10,000 and 22,000, respectively, by size exclusion chromatography. The allyl acetate content in the copolymer was determined 4.4 mol % by analyzing $^1$H-NMR spectrum and it can be considered that the difference between polymer 1-1 and polymer 1-2 are within the margin of experimental error and they are the same polymer.

When the polymerization was carried out continuously for four hours under the same reaction conditions with polymerization reaction 1-2 without the cyclical use of the catalyst, the polymer productivity per catalyst in the relevant time (two to four hours) was 21.0 g/mmol-catalyst. When the results of polymerization reaction 1-2 are compared to it, the catalyst activity reproduction after the cyclical use of the catalyst was found to be 93%.

Example 2

Cyclical Use of a Metal Complex Catalyst in the Copolymerization Reaction of Allyl Acetate and Ethylene A toluene solution (37.5 ml) of Metal complex catalyst 1 (0.10 mmol) was added into a 120 ml-volume autoclave containing allyl acetate (37.5 ml, 34.9 g, 348 mmol) under nitrogen atmosphere. After filling the autoclave with ethylene (3.0 MPa), the content of the autoclave was stirred at 80° C. for 24 hours to carry out the copolymerization reaction (polymerization reaction 2-1). After reducing the ethylene pressure, the polymerization reaction solution was cooled to room temperature, and the polymer was precipitated from the polymerization reaction solution. The polymerization reaction solution as a slurry solution of the polymer was filtered under nitrogen atmosphere to thereby be separated into the filtrate, which contains the metal complex catalyst, and the polymer, and the polymer was dried under reduced pressure. The yield of the isolated polymer (polymer 2-1) was 8.19 g and the polymer productivity per catalyst was 81.9 g/mmol-catalyst. The number average molecular weight and weight average molecular weight of the copolymer were calculated 13,000 and 28,000, respectively, by size exclusion chromatography. The allyl acetate content in the copolymer was determined 4.0 mol % by analyzing $^1$H-NMR spectrum. By the analysis of $^1$H-NMR spectrum of the filtrate, the catalyst in the filtrate was found to be a metal complex catalyst (C1-1) having a structure that the Pd-Me bonding moiety of metal complex catalyst 1 was substituted by a Pd—OAc bond. The quantity of Pd as a catalyst constituent contained in the filtrate and polymer was determined by the ICP mass spectrometry, and it was found that 96% of the charged amount of the catalyst was contained in the filtrate.

The recovered solution obtained by filtration was supplied again to the 120 ml-volume autoclave. After adding allyl acetate in an amount consumed in the reaction, a mixed solution of allyl acetate/toluene (volume ratio of 1:1) was replenished so that the total solution amount becomes 75.0 ml. After filling the autoclave with ethylene (3.0 MPa), the content of the autoclave was stirred at 80° C. for 24 hours to carry out the copolymerization reaction (polymerization reaction 2-2). After reducing the ethylene pressure, the polymerization reaction solution was cooled to room temperature, and the polymer was precipitated from the polymerization reaction solution. The polymerization reaction solution as a slurry solution of the polymer was filtered under nitrogen atmosphere to thereby be separated into the filtrate, which contains the metal complex catalyst, and the polymer, and the polymer was dried under reduced pressure. The yield of the isolated polymer (polymer 2-2) was 5.24 g and the polymer productivity per catalyst was 52.4 g/mmol-catalyst. The number average molecular weight and weight average molecular weight of the copolymer were calculated 13,000 and 29,000, respectively, by size exclusion chromatography. The allyl acetate content in the copolymer was determined 4.0 mol % by analyzing $^1$H-NMR spectrum and it can be considered that the difference between polymer 2-1 and polymer 2-2 are within the margin of experimental error and they are the same polymer.

When the polymerization was carried out continuously for 48 hours under the same reaction conditions with polymerization reaction 2-2 without the cyclical use of the catalyst, the polymer productivity per catalyst in the relevant time (24 to 48 hours) was 58.3 g/mmol-catalyst. When the results of polymerization reaction 2-2 are compared to it, the catalyst activity reproduction after the cyclical use of the catalyst was found to be 90%.

Example 3

Cyclical Use of a Metal Complex Catalyst in the Copolymerization Reaction of Allyl Acetate and Ethylene Metal complex catalyst 1 (0.010 mmol) was dissolved in allyl acetate (75.0 ml, 69.8 g, 696 mmol) and added to a 120 ml-volume autoclave under nitrogen atmosphere. After filling the autoclave with ethylene (4.0 MPa), the content of the autoclave was stirred at 80° C. for 95 hours to carry out the copolymerization reaction (polymerization reaction 3-1). Subsequently, the cyclical use of the catalyst (separation of the polymer and filtrate by suction filtration and re-polymerization reaction using the recovered filtrate) was repeated three times in the same way as in Example 1 (polymerization reaction 3-2 to 3-4).

Figure 2:
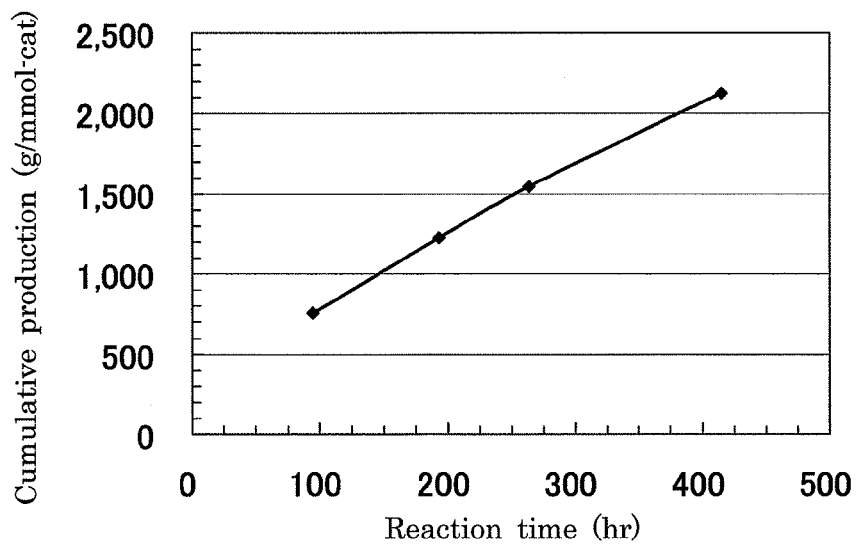
FIG. 2 is a graph showing a relationship between the reaction time and cumulative polymer productivity in an allyl acetate/ethylene copolymerization reaction of Example 3.

Table 1 shows the results of the reaction and FIG. 2 shows a graph in which the cumulative polymer productivity against reaction time is plotted. As in FIG. 2, the polymer productivity showed a nearly linear increase with reaction time. The residual ratio of the catalyst in the polymer in Table 1 is calculated by determining the quantity of Pd as a catalyst constituent, which remained in the polymer and failed to be recovered, by ICP-mass spectrometry, and by expressing the ratio of the residual Pd amount to the charged amount of the catalyst in percentage. That is, even repeating the cyclical use of the polymerization reaction solution three times, the amount of the catalyst which failed to be separated and remained in the polymer was 5% at most, and the catalyst could be recovered into the filtrate. Also, the residual Pd amount in the polymer was several micrograms per gram (μg/g). Thus, the present invention enabled retention of the catalyst activity without deactivating the catalyst even after the longtime reaction and with little loss in the catalyst if the cyclical use of the filtrate after separating the polymer is repeated.

TABLE 1

| Reaction No. | Reaction time hours | Yield g | Productivity g-polymer/ mmol-cat | Catalyst residual ratio in polymer % | Pd content in polymer μg/g |
|---|---|---|---|---|---|
| 3-1 | 95.0 | 7.59 | 759 | 2 | 2.9 |
| 3-2 | 98.0 | 4.67 | 467 | 1 | 2.8 |
| 3-3 | 70.0 | 3.20 | 320 | 1 | 3.3 |
| 3-4 | 152.0 | 5.80 | 580 | 1 | 3.2 |
| Total | 415.0 | 21.3 | 2,126 | 5 | 3.0 |

Comparative Example 1

Copolymerization of Methyl Acrylate/Ethylene

A toluene solution (37.5 ml) of Metal complex catalyst 1 (0.10 mmol) was added to a 120 ml-volume autoclave containing methyl acrylate (37.5 ml, 35.9 g, 417 mmol) under nitrogen atmosphere. After filling the autoclave with ethylene (3.0 MPa), the content of the autoclave was stirred at 80° C. for three hours to carry out the copolymerization reaction.

After reducing the ethylene pressure, the polymerization reaction solution was cooled to room temperature. The polymerization reaction solution as a white slurry solution was subjected to suction-filtration under nitrogen atmosphere to thereby separate a translucent filtrate and polymer A, and polymer A was dried under reduced pressure. The yield of polymer A was 3.14 g. Since the polymer was dissolved in the filtrate, methanol (400 ml) was added to the filtrate to thereby precipitate the remaining polymer, and polymer B was recovered by suction-filtration and dried under reduced pressure. The yield of polymer B was 3.55 g.

The yield of the separated polymer (total of polymers A and B) was 6.69 g, and the polymer productivity per catalyst was 66.9 g/mmol-catalyst. By size exclusion chromatography, the number average molecular weight and weight average molecular weight of polymer A were calculated 9,000 and 18,000, and the number average molecular weight and weight average molecular weight of polymer B were calculated 7,000 and 13,000. The methyl acrylate content in polymers A and B determined by analyzing $^1$H-NMR spectrum was 9.2 mol % in polymer A and 12.4 mol % in polymer B, respectively. The Pd catalyst residual ratio in polymer A and polymer B was determined by ICP-mass spectrometry and found to be 9% (300 μg/g) and 22% (672 μg/g), respectively.

Accordingly, since 31% of the charged amount of the catalyst remains in the polymer (total of polymers A and B) after one polymerization reaction, it is difficult to cyclically use the catalyst using methyl acrylate which is not included in formula (1), as a polar group-containing monomer. Also, the catalyst residue remained in the polymer in large amounts.

Comparative Example 2

Homopolymerization Reaction of Ethylene

A solution of Metal complex catalyst 1 (0.05 ml) dissolved in 75 ml of toluene was added into a 120 ml-volume autoclave under nitrogen atmosphere. After filling the autoclave with ethylene (3.0 MPa), the content of the autoclave was stirred at 80° C. for one hour to carry out the polymerization reaction.

After reducing the ethylene pressure, the polymerization reaction solution was cooled to room temperature. The slurry solution obtained by pouring the reaction solution into methanol was filtrated to thereby obtain polyethylene in white solid powder.

The yield of the separated polymer was 8.3 g. By size exclusion chromatography, the number average molecular weight was 30,000 and Mw/Mn was 2.3. The Pd catalyst residual ratio in the polymer was determined by ICP-mass spectrometry and found to be 214 μg/g (residual ratio of 33% to the charged amount).

DESCRIPTION OF REFERENCE NUMERALS

1 Polymerization reactor
2 Solid liquid separator
3 Polymer slurry
4 Recovered solution of the catalyst
5 Supply inlet of materials
6 Polymer draw line

The invention claimed is:

1. A method of producing a polymer in the method for producing a copolymer of olefin and a polar group-containing monomer represented by formula (1):

(in the formula, three to five $R^1$'s may be identical to each other or different from each other, each representing a hydrogen atom or a hydrocarbon group having 1 to 5 carbon atoms; $R^2$ represents —$OR^{2-1}$, —$SR^{2-1}$, —$OCOR^{2-1}$ where $R^{2-1}$ represents a hydrogen atom or a hydrocarbon group having 1 to 18 carbon atoms, —$N(R^{2-2})_2$ where two $R^{2-2}$'s may be identical to each other or different from each other, each representing a hydrogen atom, a hydrocarbon group having 1 to 18 carbon atoms, —$COR^{2-3}$, or —$COOR^{2-3}$ where $R^{2-3}$ represents a hydrocarbon group having 1 to 10 carbon atoms, or a halogen atom; and n represents 0 or 1), the method comprising using a complex of a metal in Group 10 of the periodic table as a catalyst; and supplying a catalyst solution separated from a polymer after the polymerization reaction to a polymerization reaction system to recycle and re-use the catalyst, wherein the catalyst made of the complex of the metal in Group 10 of the periodic table is represented by formula (C1):

(in the formula, M represents a metal atom in Group 10 of the periodic table; $L^1$ represents a group having a nitrogen atom (N), a phosphorus atom (P), or an arsenic atom (As) and bonded to M at the atom; $L^2$ represents a group having an oxygen atom (O) or a sulfur atom (S) and bonded to M at the atom; $L^3$ represents an electron-donating ligand; and $R^3$ represents a hydrogen atom, an acyloxy group, or a hydrocarbon group which has 1 to 30 carbon atoms and which may be substituted by one or more groups selected from a halogen atom, an alkoxy group, an aryloxy group and an acyloxy group); and wherein the polymer is separated out of the catalyst solution by using a solid-liquid separator selected from the group consisting of a centrifugation separator and a filtration separator.

2. The method of producing a polymer according to claim 1, wherein the supply of the catalyst solution separated from the polymer after the polymerization reaction to the polymerization reaction system to recycle and re-use the catalyst is carried out without any post-treatment.

3. The method of producing a polymer according to claim 1, in which the catalyst represented by the general formula (C1) is represented by formula (C2):

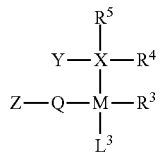

(C2)

(in the formula, M represents a metal atom in Group 10 of the periodic table; X represents a phosphorus atom (P) or an arsenic atom (As); $R^3$ represents a hydrogen atom, an acyloxy group, or a hydrocarbon group which has 1 to 30 carbon atoms and which may be substituted by one or more groups selected from a halogen atom, an alkoxy group, an aryloxy group and an acyloxy group; Y, $R^4$, and $R^5$ each independently represent a hydrogen atom, an alkoxy group, an aryloxy group, a silyl group, an amino group, or a hydrocarbon group which has 1 to 30 carbon atoms and which may be substituted by one or more groups selected from a halogen atom, an alkoxy group and an aryloxy group; $R^4$ and $R^5$ may be bonded to each other to form a ring structure; Q represents a divalent group represented in the following brackets "[ ]" in Z[—S(=O)$_2$—O-]M, Z[—C(=O)—O-]M, Z[—P(=O)(—OH)—O-]M, or Z[—S-]M where Z and M at the beginning and at the end of the formulae are described to show a bonding direction of the group); Z represents a hydrogen atom or a hydrocarbon which has 1 to 40 carbon atoms and which may be substituted by one or more groups selected from a halogen atom, an alkoxy group, and an aryloxy group; Y and Z may be bonded to each other to form a ring structure; $R^4$ and/or $R^5$ may be bonded to Y to form a ring structure; and $L^3$ represents an electron-donating ligand).

4. The method of producing a polymer according to claim 3, wherein the catalyst represented by formula (C2) is represented by formula (C3):

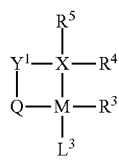

(C3)

(In the formula, $Y^1$ represents a divalent hydrocarbon group which has 1 to 70 carbon atoms and which may be substituted by one or more groups selected from a halogen atom, an alkoxy group, and an aryloxy group; and Q, M, X, $R^3$, $R^4$, $R^5$, and $L^3$ have the same meanings as in formula (C2)).

5. The method of producing a polymer according to claim 4, in which the catalyst represented by (C3) is represented by formula (C4):

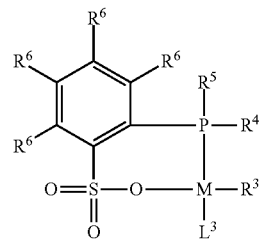

(C4)

(in the formula, four $R^6$'s each independently represent a hydrogen atom, an alkyl group having 1 to 8 carbon atoms, an alkoxy group having 1 to 8 carbon atoms, an aryloxy group having 6 to 18 carbon atoms, or a halogen atom; and M, $R^3$, $R^4$, $R^5$, and $L^3$ have the same meanings as in formula (C2)).

6. The method of producing a polymer according to claim 1, wherein part of a polymerization reaction liquid is continuously withdrawn from a polymerization reactor during the polymerization reaction of the monomer using a continuous polymerization reaction apparatus provided with the polymerization reactor and the solid-liquid separator; the catalyst solution and the polymer are separated in the solid-liquid separator; and the separated catalyst solution is returned to the polymerization reactor without being treated.

7. The method of producing a polymer according to claim 2, wherein part of a polymerization reaction liquid is continuously withdrawn from a polymerization reactor during the polymerization reaction of the monomer using a continuous polymerization reaction apparatus provided with the polymerization reactor and the solid-liquid separator; the catalyst solution and the polymer are separated in the solid-liquid separator; and the separated catalyst solution is returned to the polymerization reactor without being treated.

8. The method of producing a polymer according to claim 3, wherein part of a polymerization reaction liquid is continuously withdrawn from a polymerization reactor during the polymerization reaction of the monomer using a continuous polymerization reaction apparatus provided with the polymerization reactor and the solid-liquid separator; the catalyst solution and the polymer are separated in the solid-liquid separator; and the separated catalyst solution is returned to the polymerization reactor without being treated.

9. The method of producing a polymer according to claim 4, wherein part of a polymerization reaction liquid is continuously withdrawn from a polymerization reactor during the polymerization reaction of the monomer using a continuous polymerization reaction apparatus provided with the polymerization reactor and the solid-liquid separator; the catalyst solution and the polymer are separated in the solid-liquid separator; and the separated catalyst solution is returned to the polymerization reactor without being treated.

10. The method of producing a polymer according to claim 5, wherein part of a polymerization reaction liquid is continuously withdrawn from a polymerization reactor during the polymerization reaction of the monomer using a continuous polymerization reaction apparatus provided with the polymerization reactor and the solid-liquid separator; the catalyst solution and the polymer are separated in the solid-liquid separator; and the separated catalyst solution is returned to the polymerization reactor without being treated.

* * * * *